US012682096B2

(12) United States Patent
Sun et al.

(10) Patent No.: US 12,682,096 B2
(45) Date of Patent: Jul. 14, 2026

(54) AUGMENTING SYSTEM ACCESS CONTROL PERSPECTIVE

(71) Applicant: International Business Machines Corporation, Armonk, NY (US)

(72) Inventors: Sheng Yan Sun, Beijing (CN); Xu Qin Zhao, Beijing (CN); Jian Xu, Beijing (CN); Peng Hui Jiang, Beijing (CN); Xuelian Zhang, Beijing (CN); Ting Ting Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 18/378,894

(22) Filed: Oct. 11, 2023

(65) Prior Publication Data

US 2025/0124150 A1 Apr. 17, 2025

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01)

(58) Field of Classification Search
CPC ........................... G06F 21/6218; G06F 21/604
See application file for complete search history.

(56) References Cited

U.S. PATENT DOCUMENTS 8,983,877 B2 * 3/2015 Chari .................... G06F 21/604
707/738
9,842,218 B1 * 12/2017 Brisebois .............. H04L 63/101
(Continued)

FOREIGN PATENT DOCUMENTS

CN 105282160 A 1/2016

OTHER PUBLICATIONS

Ahmadi, H., et al., "Graph Model Implementation of Attribute-Based Access Control Policies", https://arxiv.org/ftp/arxiv/papers/1909/1909.09904.pdf, Sep. 2019, pp. 1-20.

(Continued)

*Primary Examiner* — Jason Chiang

(74) *Attorney, Agent, or Firm* — Scully, Scott, Murphy & Presser, P.C.; Lily Neff

(57) ABSTRACT

A system and method for dynamically visualize and modify user authority and security resource edge based on access behaviors in a cloud computing environment. The method provides a new access control perspective to ensure the credibility of database object usage patterns, build clearer and explicit security data consumption mode for data usage requests, and guide tenants to have a more comprehensive understanding and concise use. Processing components and method are configured to gather data and analytics including collecting data resource and database object usage tagging both resources and users with security level by machine learning and building an access model for each role. The method uses graph modeling with created, trained access patterns for users protected resources and produces in-memory implicit sub-groups for users with similar access requirements and limits their resource accesses according to their history behaviors. Further provided are outlier activities prediction and in-real time access authorization modification.

19 Claims, 12 Drawing Sheets

(56) References Cited

U.S. PATENT DOCUMENTS

| | | | | |
|---|---|---|---|---|
| 10,079,832 | B1 * | 9/2018 | Dearment | G06F 8/60 |
| 10,192,169 | B2 * | 1/2019 | Gusev | H04L 43/0876 |
| 10,326,748 | B1 * | 6/2019 | Brisebois | G06F 21/31 |
| 10,417,613 | B1 * | 9/2019 | Brisebois | G06F 21/552 |
| 10,454,934 | B2 | 10/2019 | Parimi et al. | |
| 10,536,352 | B1 * | 1/2020 | Brisebois | G06F 16/90335 |
| 11,443,232 | B1 * | 9/2022 | Rahman | G06F 18/2148 |
| 11,537,575 | B1 * | 12/2022 | McNair | G06F 11/3409 |
| 11,909,752 | B1 * | 2/2024 | Kapoor | H04L 67/306 |
| 12,137,098 | B2 * | 11/2024 | Cohen | H04L 63/102 |
| 2007/0136291 | A1 * | 6/2007 | Bird | G06F 21/6227 |
| | | | | 707/999.009 |
| 2016/0180234 | A1 * | 6/2016 | Siebach | G06N 5/048 |
| | | | | 705/321 |
| 2016/0353166 | A1 * | 12/2016 | Arsenault | H04N 21/44218 |
| 2019/0132224 | A1 * | 5/2019 | Verma | G06F 18/24 |
| 2019/0220471 | A1 * | 7/2019 | Mota Toledo | G06F 16/906 |
| 2019/0253427 | A1 * | 8/2019 | Kling | G06F 3/0622 |
| 2019/0327271 | A1 * | 10/2019 | Saxena | G06N 3/0455 |
| 2020/0007411 | A1 * | 1/2020 | Arar | G06F 8/31 |
| 2020/0090034 | A1 * | 3/2020 | Ramachandran | G06F 16/243 |
| 2020/0193038 | A1 | 6/2020 | Ravizza et al. | |
| 2020/0272912 | A1 * | 8/2020 | Chacko | G06F 9/547 |
| 2020/0356462 | A1 * | 11/2020 | Anand | G06N 3/092 |
| 2021/0042309 | A1 * | 2/2021 | Mustafi | G06F 16/258 |
| 2021/0049497 | A1 * | 2/2021 | Jia | G06N 20/00 |
| 2021/0081366 | A1 * | 3/2021 | Madisetti | G06F 40/289 |
| 2021/0191957 | A1 * | 6/2021 | Swamy | G06N 5/025 |
| 2021/0248534 | A1 * | 8/2021 | Ares | G06F 16/283 |
| 2022/0083871 | A1 * | 3/2022 | Nemirovsky | G06N 20/00 |
| 2022/0188359 | A1 * | 6/2022 | Laliberte | G06F 16/285 |
| 2022/0247678 | A1 * | 8/2022 | Atwal | H04L 45/645 |
| 2022/0335184 | A1 * | 10/2022 | Wesley | G06F 16/358 |
| 2023/0067944 | A1 * | 3/2023 | Ares | G06F 16/26 |
| 2023/0095756 | A1 * | 3/2023 | Wilkinson | H04L 63/1416 |
| | | | | 726/6 |
| 2023/0179603 | A1 * | 6/2023 | Gopinathapai | H04L 63/104 |
| | | | | 726/4 |
| 2023/0273908 | A1 * | 8/2023 | Souza Vaz | G06F 16/2282 |
| | | | | 707/609 |
| 2023/0385085 | A1 * | 11/2023 | Singh | G06N 7/01 |
| 2024/0031367 | A1 * | 1/2024 | Pringle | H04L 63/10 |
| 2024/0232393 | A1 * | 7/2024 | Nowak | G06F 21/604 |
| 2024/0289489 | A1 * | 8/2024 | Ezrielev | G06F 21/6218 |

OTHER PUBLICATIONS

Fong, P.W.L., et al., "Relationship-Based Access Control: Protection Model and Policy Language", Codaspy'11, Feb. 21-23, 2011, 11 pages.

Morgado, C., et al., "A Security Model for Access Control in Graph-Oriented Databases", 2018 IEEE International Conference on Software Quality, Reliability and Security, Jul. 2018, pp. 135-142.

* cited by examiner

600

| Resource 602 | Action 604 | Resource action level 606 | Time window 608 |
|---|---|---|---|
| Salary_table | Read | 8 | 1 month |
| Salaery_table | Write | 9 | 1 year |
| Log_table | Write | 10 | 1 week |
| Log_table | Read | 1 | 1 year |

AUGMENTING SYSTEM ACCESS CONTROL PERSPECTIVE

BACKGROUND

This disclosure is directed to memory systems and databases generally, and more particularly to systems and methods for improving database security, including assessing behaviors in a cloud computing environment and providing an access control perspective to ensure the credibility of database object usage patterns in the cloud computing environment.

In a cloud computing environment, massive user access behavior has obvious big data characteristics, and user operation behaviors are more diverse and random.

Conventional data security systems use security policies, rules and roles to group users into different groups, and match the use of roles and resources. Though different users have different access authority, coarse-grained access control can lead to resource waste, system performance degradation, and security vulnerabilities. For example, Role Based Access Control (RBAC) is one common method today and due to some reason, the access authority assigned to one person may not be the minimal collection. When a user is assigned access authority, s/he may be given a bigger one. Additionally, some access authorizations are not needed any more over time.

Furthermore, letting users access more data than they really need contradicts the zero-trust security management strategy with potential exposure of resources that should be protected more strictly. On the other hand, improper changes to the user groups or access structures may cause users to not be able to perform their daily work properly after they loose access to some resources.

With applications constantly evolving and user structures changing, this fine-tune process needs to be iterated constantly and well implemented visibility.

SUMMARY

A system and method for providing dynamically visualize/modify user authority and security resource edge based on access behaviors in a cloud computing environment.

A system and method to ensure the credibility of users' resource/data access behavior in cloud computing environment and render more clearer and explicit security data consumption mode for data access users.

A system and method to guide users to have a more comprehensive understanding and concise use of security access data for data visualization in the security field.

The system and method provides a new access control perspective to ensure the credibility of database object usage pattern in cloud computing environment, build clearer and explicit security data consumption mode for data usage requests, and guide tenants to have a more comprehensive understanding and concise use.

The system and method provides an in real-time scenario for security managers to monitor unusual behaviors such as being notified when a user has not accessed a resource he/she has authority to in a long time.

In one aspect, there is provided a computer system for database access control. The computer system comprises: a hardware processor associated with a memory storing program instructions in a computer system, the hardware processor running the program instructions configuring the processor to: monitor database usage activities of users of a database resource object, the users having an associated role;

run a machine learned model trained to predict, based on past database resource usage activities by the users having a same associated role, a user activity with respect to a database resource object for a particular role; tag, based on the predicted user activity, a user with an associated security level, and tag the database resource object with a resource action level indicating a degree of authorization required to access the database resource object by a user; and in response to a received user request to access a database resource object, grant the user to access the requested database resource object based on that user's associated security level and the resource action level associated with the requested database resource object.

In a further aspect, there is provided a method for database access control. The method comprises: monitoring, using a hardware processor at a computer system, database usage activities of users of a database resource object, the users having an associated role; running, using the hardware processor, a machine learned model trained to predict, based on past database resource usage activities by the users having a same associated role, a user activity with respect to a database resource object for a particular role; tagging, using a hardware processor, based on the predicted user activity, a user with an associated security level, and tagging the database resource object with a resource action level indicating a degree of authorization required to access the database resource object by a user; and in response to a received user request to access a database resource object, grant the user to access the requested database resource object based on that user's associated security level and the resource action level associated with the requested database resource object.

A computer readable storage medium storing a program of instructions executable by a machine to perform one or more methods described herein is also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 8 depicts an example of a resource action time window table resulting from the collecting and analyzing of resource usage data;

DETAILED DESCRIPTION

Figure 1:
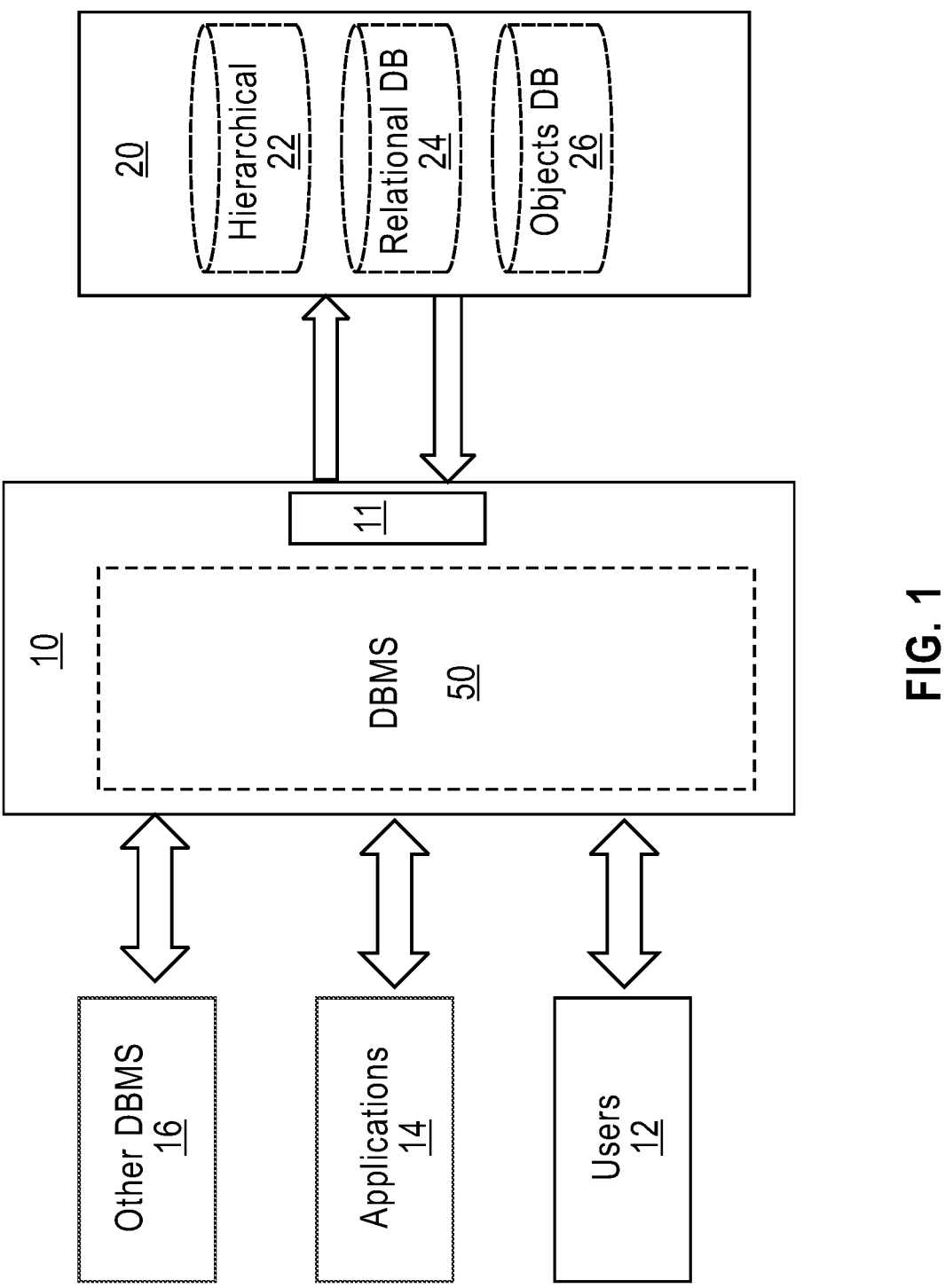
FIG. 1 depicts a generic block diagram of a simple database management system running on a computer system according to embodiments herein.

The following description is made for illustrating the general principles of the invention and is not meant to limit the inventive concepts claimed herein. In the following detailed description, numerous details are set forth in order to provide an understanding of the computer system, computer architectural structure, processor, execution units, and their method of operation, etc., however, it will be understood by those skilled in the art that different and numerous embodiments of the computer system, computer architectural structure, execution units, memory, and their method of operation may be practiced without those specific details, and the claims and invention should not be limited to the system, assemblies, subassemblies, embodiments, functional units, features, circuitry, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and processor architecture, memory, database and database management system architectures and associated security policies which are apparent to those skilled in the art. It is assumed that those skilled in the art are familiar with the general architecture of processors, and in particular, with processors having execution pipelines making use of various memory units, e.g., database, cache and other memory systems. It may be noted that a numbered element is numbered according to the figure in which the element is introduced, and is often, but not always, referred to by that number in succeeding figures.

According to an aspect of the invention, there is provided a system and method having the following main processes and components:

i) a data gather and analytics processor programmed to: collect data resource and database object usage; tag both resources and users with security level by machine learning; build a database usage model for each role; and use time series data for outlier activities prediction;

ii) a usage mapping and monitoring processor programmed with ability to perform: graph modeling with created and trained access patterns for users' of protected resources and producing in-memory implicit sub-groups for users with similar access requirements and limiting their resource accesses according to their history behaviors; determine outlier activities when monitoring real-time database resource usage requests and give out warnings or alerts when a database resource is not used during the history collection period;

iii) an Access Manager and perspective processor programmed with ability to: provide a graph view for real-time user/role/resource access activities correlation; and correct for outlier activities and in-real time access authentication modification; and iv) a cloud cluster view and model split/merge processor programmed with ability to: initiate a new coming node with initial business process, and for a similar business cloud addition/removal of nodes, update the whole view in real time. A cloud cluster view and model split/merge step clarifies how a node addition/removal can be reflected in the cluster view instantaneously in real time.

According to an aspect of the invention, there is provided a computer system for database access control. The computer system includes a hardware processor associated with a memory storing program instructions in a computer system, the hardware processor running the program instructions configuring the processor to: monitor database usage activities of users of a database resource object, the users having an associated role; run a machine learned model trained to predict, based on past database resource usage activities by the users having a same associated role, a user activity with respect to a database resource object for a particular role; tag, based on the predicted user activity, a user with an associated security level, and tag the database resource object with a resource action level indicating a degree of authorization required to access the database resource object by a user; and in response to a received user request to access a database resource object, grant the user to access the requested database resource object based on that user's associated security level and the resource action level associated with the requested database resource object.

In accordance with an embodiment of the system, to monitor database usage activities of users, the hardware processor is further configured to: obtain time-series data from past database resource object usage by the users; and train the machine learned prediction model using the time-series data obtained from past database resource object usage by the users.

In accordance with an embodiment of the system, the hardware processor is further configured to: determine whether the received user request to access a database resource object is an outlier activity with respect to a database resource object usage for the associated user role;

and generate an alert when the received user request is determined as an outlier activity.

In accordance with an embodiment of the system, the hardware processor is further configured to: identify, using the machine learned prediction model, patterns of user activity with respect to database resource objects; and generate, based on the identified user activity patterns, a graph model view for visualizing the user access patterns on a display device, the graph model view having an interconnection of first nodes corresponding to users, and second nodes corresponding to database resources.

In accordance with an embodiment of the system, the hardware processor is further configured to: use the graph model view to determine, in real time, whether a current received user request for a database resource is an outlier activity.

In accordance with an embodiment of the system, the hardware processor is further configured to: produce one or more implicit sub-groups of users having similar database resource object access requirements; store the one or more implicit sub-groups of users in a memory; and limit the resource accesses of users in the implicit sub-group of users according to the users' prior database resource object access activity pattern.

In accordance with an embodiment of the system, the hardware processor is further configured to: associate, based on identified patterns of user activities with respect to a database resource object, a database resource object action; and modify, responsive to a predicted user activity, the resource action level associated with the database resource object action.

In accordance with an embodiment of the system, the hardware processor is further configured to: associate, based on identified patterns of user activities with respect to a database resource object, a time window with database resource object action, the time window indicating a period of time a user is authorized to perform the database resource object action; determine a time elapsed since a time a user has last performed the action with respect to the database resource object; and automatically revoke a user's authorization to perform the database resource object action after the elapsed time has exceeded the time window period.

In accordance with an embodiment of the system, to grant the user to access the requested database resource object, the hardware processor is further configured to: compare a user's associated security level against the resource action level associated with the requested database resource object; and grant user access to the requested database resource object when the user's associated security level exceeds the resource action level of the requested database resource object.

FIG. 1 depicts a generic block diagram of a simple database management system 50 running on a computer system 10 having a control processor or control processing unit (CPU) 11. The database management system (DBMS) 50 is a tool providing an interface for users 12, application programs, 14 and other database management systems 16 to perform various database operations including, but not limited to: creating, protecting, reading, updating and deleting resources, e.g., data, in a database. As shown in FIG. 1, a database can include a single resource storage device 20 or, can include plural data storage devices, e.g., database storage devices 22, 24, 26. In an embodiment, DBMS system can run software programs, e.g., MySQL, Oracle, DB2, which programs allow for users to create, modify, and remove definitions that define the organization of data in the database, insert, modify, delete data in the database, retrieve data from the database which can be used by applications for various purposes, and register and monitor users, enforce data security, monitor performance and maintain data integrity. To this end, the DBMS software programs allows users to define the structure of the database including use of tables, fields, and relationships between tables, or allow users to insert, update and delete data and retrieve data using queries, and provides security features to prevent unauthorized access to the database and to protect the data from loss or theft.

In an embodiment, DBMS 50 can include International Business Machine's DB2 which is a Structured Query Language (SQL)-based database engine used to manipulate the data. As shown in FIG. 1, resource storage device 20 can include one or more types of databases including but not limited to: a hierarchical database 22 having a data model configured to organize data into a tree-like structure in which data are stored as records which are connected to one another through links; a relational-type database 24 which stores data in tables with rows and columns; and an object-oriented database 26 which stores data as objects, which can be manipulated using object-oriented programming languages.

In an embodiment, the DBMS 50 provides a view of data that can be accessed by multiple users from multiple locations in a controlled manner. The DBMS system 50 can limit what data end users see and how they view the data, providing many views of a single database schema. End users and software programs do not have to know where the data is physically located or on what type of storage medium it resides because the DBMS 20 handles all requests.

Figure 2:
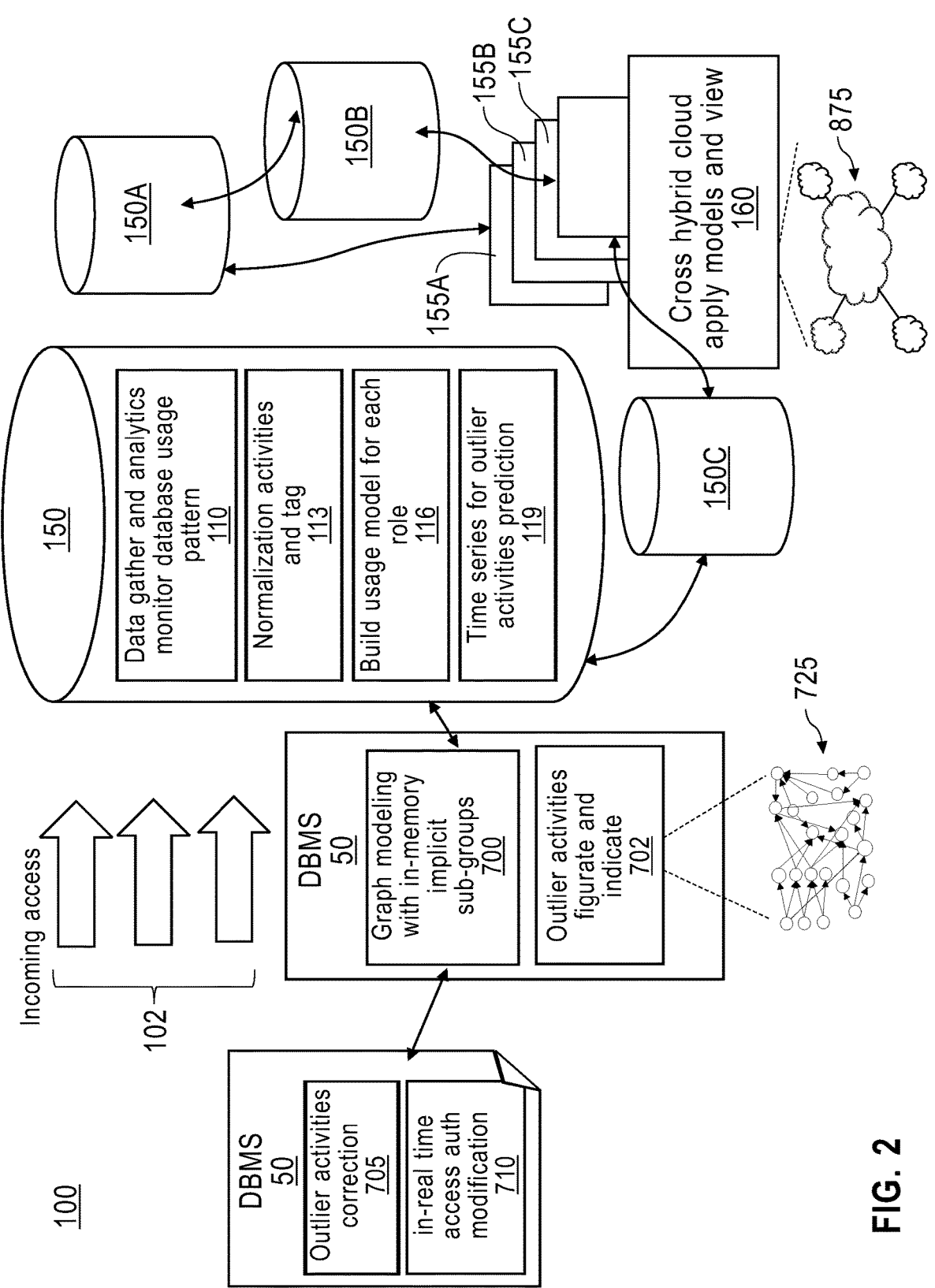
FIG. 2 depicts a computer-implemented system and the processes run at a DBMS system node for augmenting a database access control perspective according to an embodiment.

Referring to FIG. 2, there is depicted a conceptual view of a computer-implemented system 100 and the processes run at a DBMS system node 150 for augmenting a database access control perspective that aims to make user access management more granular and concise in a cloud computing environment. In one embodiment, a database object access control visualization tool is provided to help a user refine a database access security policy. For non-limiting purposes, as shown in FIG. 2, the DBMS node 150 monitors and records the incoming database activities/accesses 102, e.g., from users. In an embodiment, a database "activity" can include a database query, e.g., in a SQL format. A data gathering and analytics monitoring step 110 is performed to monitor database usage patterns for the users such as by accessing table "logs" (not shown) correlating each user and their queries. At 113, the activities are normalized such that slight variations in multiple received queries can be adjusted to obtain a single query for purposes of data collection and recordation. That is, for better training performance, multiple received queries received for purposes of data collection and recordation that have only some slight variations can be normalized as the same query style. Then, user and/or resource access by a particular user role is tagged, i.e., for association with a particular security level/policy. For non-limiting purposes of illustration, exemplary user roles can include but are not limited to: administrator, manager, editor, group leader, employee, user, etc., and exemplary security level (tag) can be a numeric value, e.g., a security level value ranging from between 0, 1, . . . , 10 with a value 10 being a most sensitive security level and 0 being least sensitive. It is assumed that, for a particular DBMS, an associated security policy has been defined which assigns a security level(s) and/or permissions for particular user role and/or database object so that an associated security level value is used as a tag for that user/role. As an example, in a banking system, a database table including user account or financial information in a column would be assigned a higher security level as compared to a security level assigned to a more generic table/column that does not have sensitive user information. Further, in view of FIG. 9B, a Doctor can select/update/delete comments of the patient who is assigned to him; however, if the Doctor wants to get another patient profile the doctor may get a security alert for sensitive data rule.

Continuing, in FIG. 2, In an embodiment, at 116, based on the recorded tagged data, the system 100 employs machine learning methods, including time series analysis and clustering, as well as anomaly detection techniques to identify user behavior patterns and access boundaries. In this manner, unconventional accesses are recorded to enable finer-grained access control and auditing without affecting everyday user activities. Thus, at 116, FIG. 2, each user's recorded accesses/activities and accessed resources, e.g., objects, that are tagged become data that is used to train a predictive usage model for each role at 116. Further, at 119, FIG. 2, responsive to the collecting of data resource and database object usage and tagging both resources and users with a security level, machine learning methods are used to build a database usage model for each role that further incorporates time series data for outlier activities prediction. In an embodiment, the resulting model at 119 is employed to predict how a user may use a different database object/resource and figure out any outlier activity indicated in a graph view perspective.

Further, as shown in FIG. 2, at 705, the DBMS system 50 provides for outlier activities correction and at 710, provides in-real time access authentication modification. That is, based on a different RR (risk rank) the method enables real-time or near-real time correction for any detected outlier activities. This real-time correction for detected outlier activities includes modifying user authority and security resource "edges" based on access behaviors, where edges refers to the group of database objects which the user has authority to work with.

As further shown in FIG. 2, in an embodiment, at or in association with the DBMS system 50 further methods are run to perform usage mapping and monitoring including: running a graph modeling method 700 to provide a graphical display view of created and trained access patterns for users' protected resources that can be used to produce in-memory implicit sub-groups for users with similar access requirements (with a sub-group structure stored in-memory for better performance) and limit their resource accesses according to their history behaviors. In this embodiment, the generated graph view enables visualization of real-time user/role/resource usage correlation. The usage model with graph view is maintained and output with a graph database management system tool such as Neo4j for adjusting entity relationship correlation. To this end, as shown in FIG. 2, at 702, the DBMS system 50 provides an outlier activities figurate, such as shown at 725, that indicates user activities including detected outlier activities. Usage mapping and monitoring further entails correcting for outlier activities and in-real time access authorization modification. This correction and in-real time access authorization modification is based upon one or more of: a different RR (risk rank) to do correction for outlier activities; or any outlier activities which in original role definition will in-real time set access authorization and trace following activities to further modify usage model.

As further shown in FIG. 2, in a hybrid cloud computing environment including many database nodes, e.g., database nodes 150A, 150B, 150C, . . . etc., processing steps 110, 113, 116, 119 are performed at each DBMS node, to monitor and record all user's incoming database activities/accesses at those nodes. Across the hybrid cloud the model and the graph view can be applied at the different database nodes. For different database nodes that have similar accesses/activities they will have similar role-based models, and the models 155A, 155B, 155C, . . . etc. can be gathered to form a cross-hybrid cloud model and view 160. Thus, new detected activities and new data can be added into a security model. For similar database application scenarios, the system can provide a cloud cluster view and further split and/or merge different security models to form a single cross-hybrid cloud model 875 that can be used by entities in the whole cloud computing environment. Thus, the addition or removal of nodes can be instantaneously reflected in a cluster view in real-time.

Figures 3, 4:
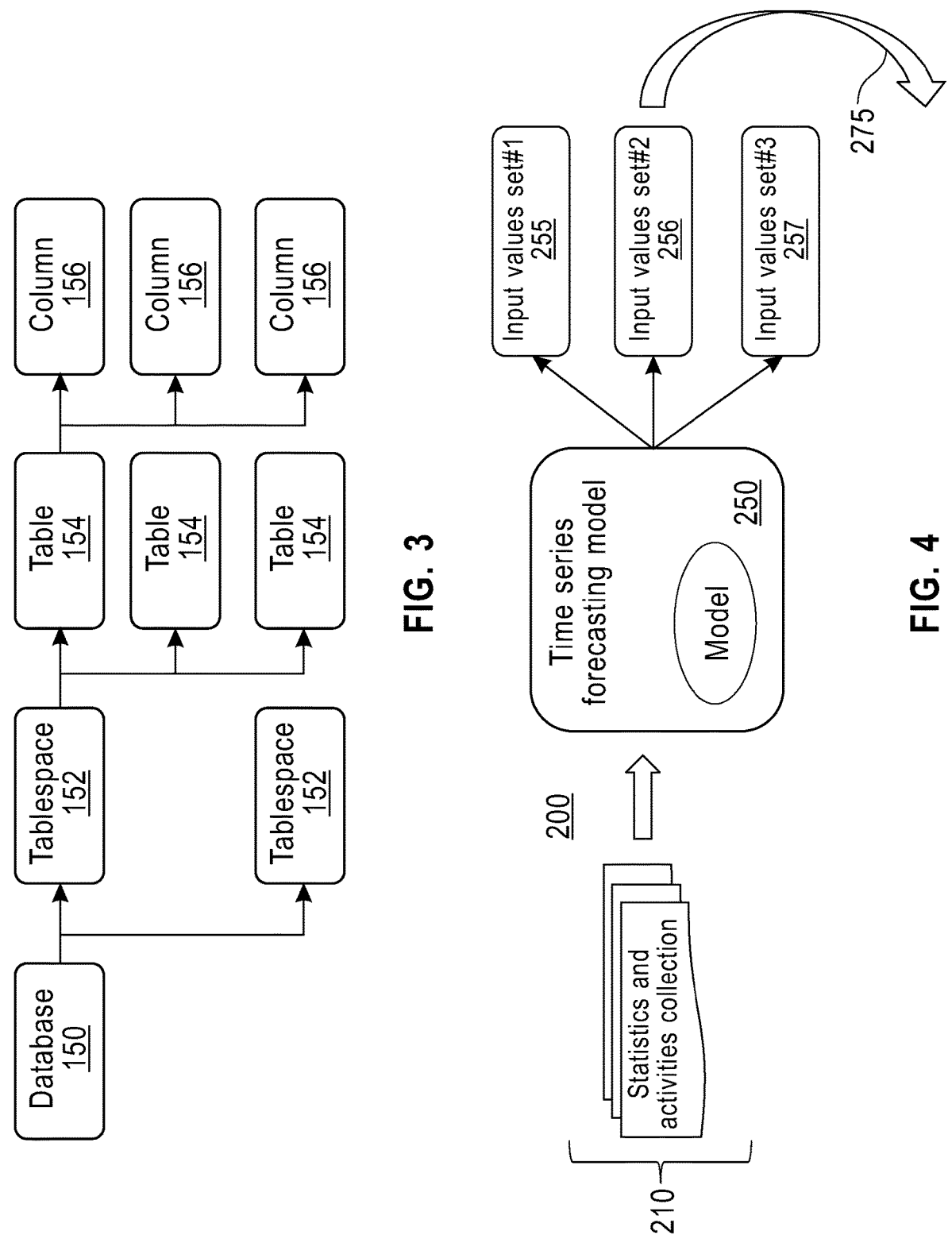
FIG. 3 depicts a more detailed diagram depicting the monitoring, gathering and analyzing of users' accesses or activities relating to different database node objects/resources according to an embodiment.
FIG. 4 depicts a model build process 200 for building a time series prediction model based on outlier activity usage time series data according to an embodiment.

FIG. 3 depicts a more detailed diagram depicting the monitoring, gathering and analyzing of users' accesses or activities relating to different database node objects/resources. As shown in FIG. 3, the DBMS at the node collects data resource usage patterns. As an example, in the case of a relational-type database, the resource object can include the database 150, the tablespace 152, table 154 and table column 156. The collected user activity data would thus include a user's access to a particular database node 150, a tablespace 152 within the node, a particular table 154 and a column 156 within the table. For example, a database access may include "Select T1.c1 from tableT1, where T1.c2=a value x", where T is a table and c is a column. Then, in accordance with a defined security policy, the system 100 tags both resources and users with security level. As an example, in a banking system, a database table 154 including user account or financial information in a column 156 can be assigned a higher security level as compared to a security level assigned to a more generic table 154/column 156 that does not have sensitive user information. Continuing, the system then builds a usage model for each user/role by machine-learning (ML) and analyzes time series data for outlier activities prediction.

FIG. 4 depicts a model build process 200 for building a time series prediction model 250 based on outlier activity usage time series data. In this embodiment, based on input statistics and all of the collected database activities/accesses data 210 that have been tagged with a security level value (e.g., 0, 1, . . . , 10), a time series prediction model 250 is built that can be implemented to predict a user role/role edge/resource usage. Based on this time series prediction model 250, it is possible to predict and form a visible sub-group of users, e.g., within an existing defined security group: for example, initially, system has Role0 which can access T1, T2 and T3, UserA and UserB owns Role0, however, based on the time series model prediction, UserA does not need to access T1, and there is formed a new role: Role1 which can access T2 and T3, and move userA from Role0 to Role1.

In an embodiment, the system 100 performs a gathering of statistics and activities collection data and detecting of the database usage pattern to generate a user/role and resource access model and peer with "risk rank" (i.e., a measurable safety of sign in behavior which refers to user login and data activities) and where "peer" refers to a corresponding authority with resource access model. This model can be used to predict a resource usage "edge"—an exceptional access of resource from which outlier activity can be determined—for each user/role and which can be used to predict any outlier usage. For example, if all users within a defined security level or group are enabled access to all database tables, e.g., three database tables, it may be detected by activity monitoring and the built time series forecasting model 250 that a first user of that security level or group is found to only periodically access a first database table and a second database table, and a second user in the same group only periodically accesses a second database table and a third database table. By processing this activity information, the generated model can subsequently be used to detect an outlier usage, e.g., should the first user (or another identical user) from the same defined security level or group attempt to access an object from another database table not normally accessed by that user (or other users) in the same group. In this example, the predicting outlier activities model 250 output can generate an outlier alert 275, e.g., to a security officer (not shown), based on the first user's attempt to access another database table not normally accessed by that first user (or other users). Moreover, the time series model 250 can be used to suggest different resources associated for use by different users of a defined security level based on the time series activity collection and outlier activities. As shown in FIG. 4, the time series model 250 can generate different predicted value sets 255, 256, 257 indicating use of objects from which outliers can be monitored. These value sets 255, 256, 257 can include values like pairs of user/objects/action/timestamps values group that can be altered based on predicted model output values.

Figure 5:
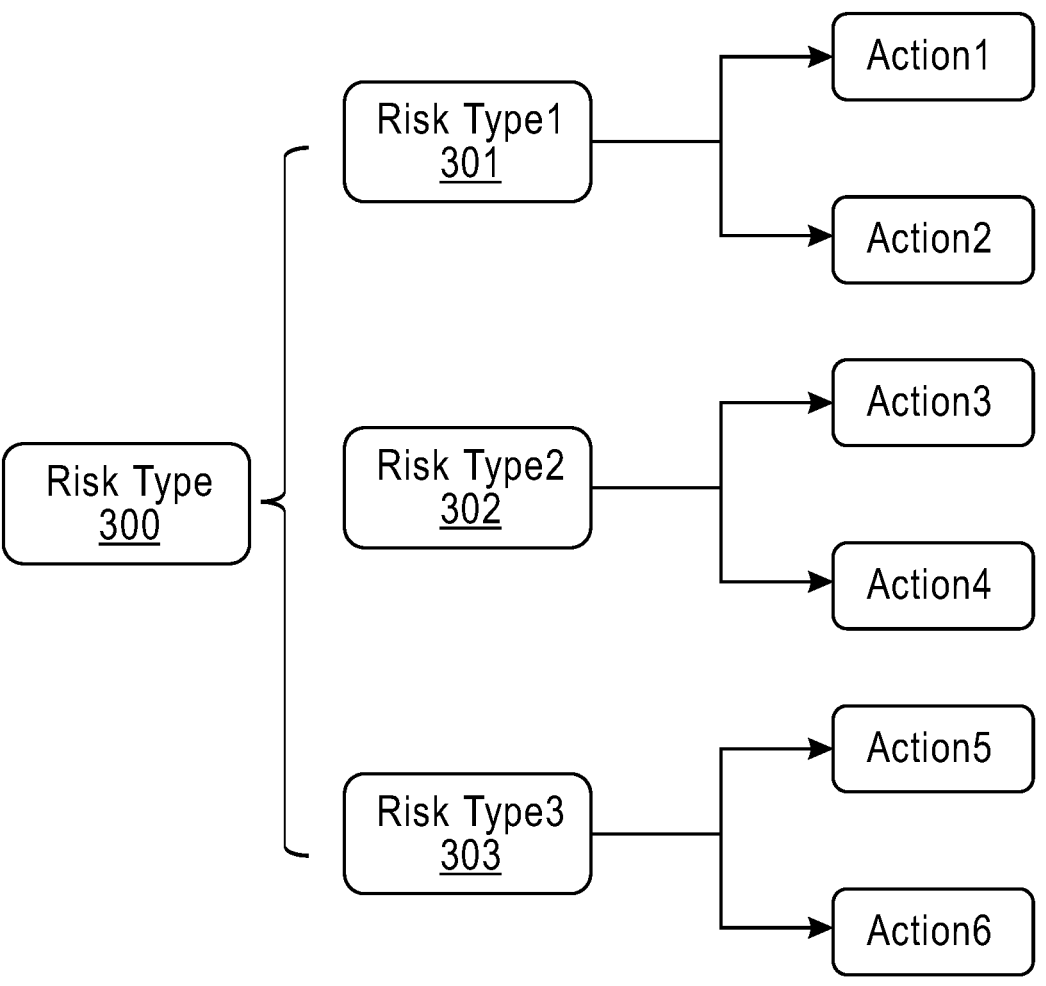
FIG. 5 depicts an access model generated for each user/role with a risk type according to an embodiment.

FIG. 5 depicts an access model 250 generated for each user/role with a risk type 300. For example, there is illustrated different risk policies, and how for different database activities, there can be security rules defined, each associated with a different risk type (e.g., type1, type2, type 3), each associated with different actions (e.g., Action1, Action2, Action3). For example, given a risk type 300, the system 100 ranks the risk type and action type to define a risk ratio range for each risk type and action type. As shown in FIG. 5, a risk type 300 can have associated first risk type 301, second risk type 302 and third risk type 303, and each risk type has associated action types: with risk type 301 associated with database action types Action1, Action2; risk type 302 having associated action types Action3, Action4; and risk type 303 having associated action types Action5, Action6. In an embodiment, a method is implemented to rank with risk type and action type to define a risk ratio range for each risk type and action type. The system re-ranks all ratios with suspected threat sessions activities in a virtual system. That is, this is designed for integration with another security management system which can define policy/set rank/set ratio for different risk/actions. Then, in accordance with this embodiment, the system implements methods to refresh a security policy in security system when result changes exceed the risk ratio range threshold. Thus, different security policies including different risk ratio and different rules which include a different risk definition—and is used to populate different resource action level (e.g., based on different risk or security policy type).

Figure 6:
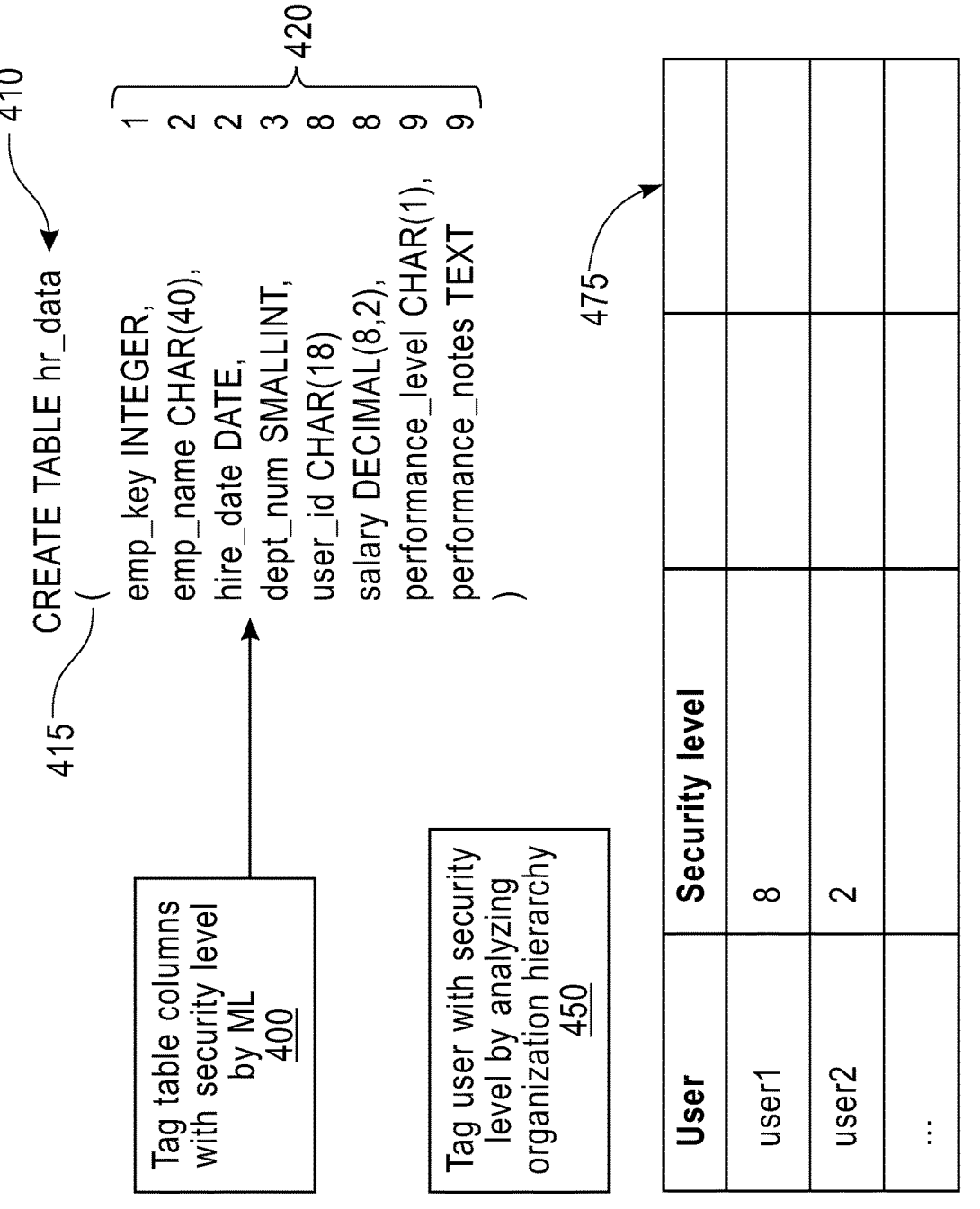
FIG. 6 depicts an implementation involving a method used to tag a database object with a security level using machine learning according to an embodiment.

Referring to FIG. 6, there is depicted an implementation involving a method 400 used to tag a database object with a security level using NLP machine learning or predefined with rule-based regex (regular expression) or manually. In a non-limiting example, code is implemented for creating a human resources table "hr_data" 410 having defined variables and constants 415 associated with a company hiring of an employee, with each variable or constant having an associated security level 420. As can be seen, variables representing the employee's name or hire data is assigned a lower security level value (e.g., 2) while variables representing the employee's salary or performance level is assigned a higher security level value (e.g., 9). In association with the data gathering and analytics step performed by the system 100, FIG. 6 depicts a step 450 of tagging a user with a security level, e.g., by analyzing an organization's hierarchy. A segment of a user security level table 475 used as input data for training the ML-time series forecasting model shows UserID column having fields including a first user User1 assigned a security level of value 8 and a second user User2 assigned a security level of value 2.

Figure 7:
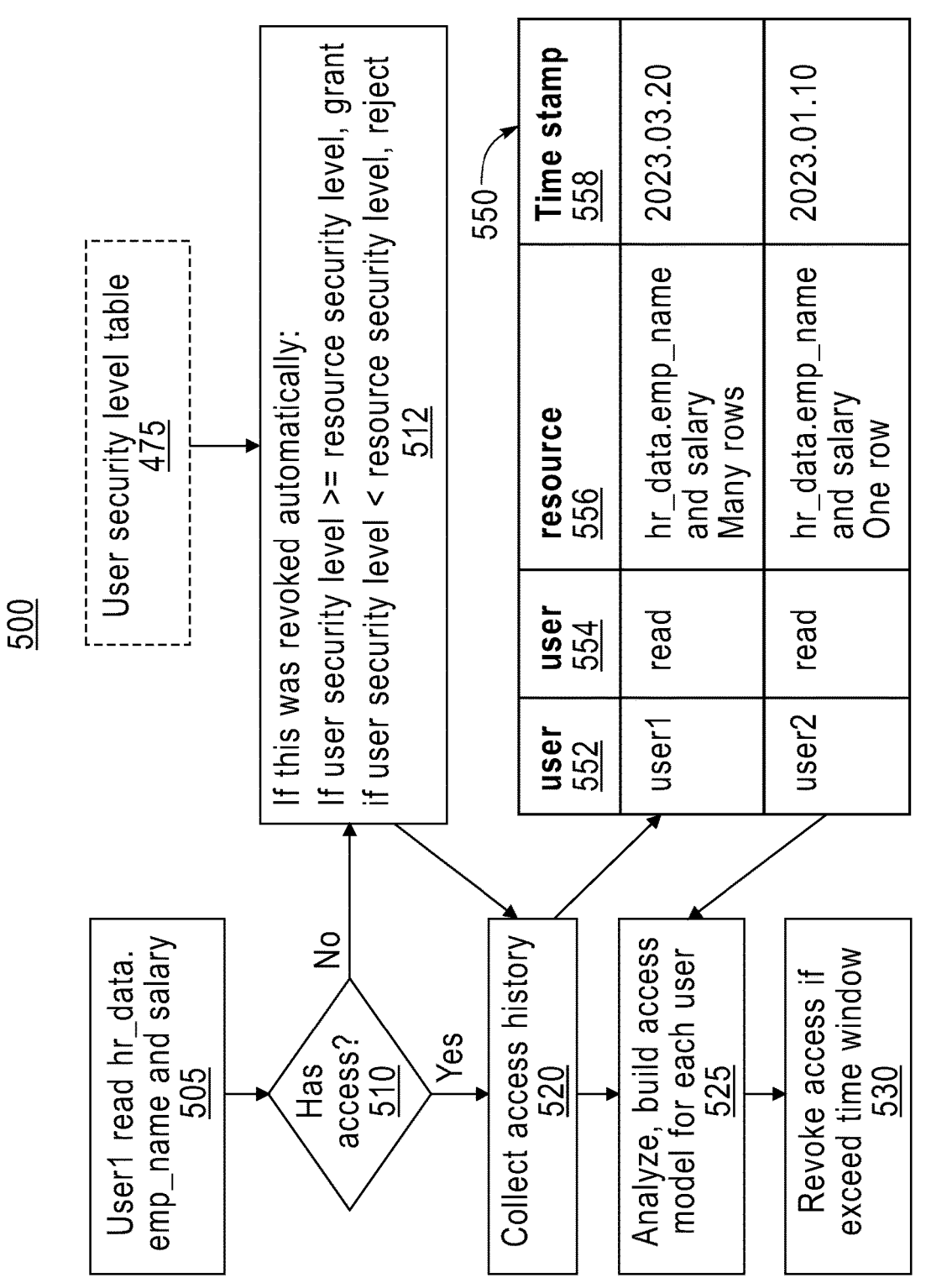
FIG. 7 depicts an overall method for building the time series prediction model based on the statistics/activities data collected for forecast model build according to an embodiment.

FIG. 7 depicts an overall method 500 for building the time series prediction model based on the statistics/activities data collected for forecast model build. In an embodiment, a first step involves a User1 accessing a database table, e.g., to perform a reading of a column at the table. In the case of the example the hr_data table 410 of FIG. 6, a first step 505 involves User1 attempting to read hr_data table's emp_name field and salary field. At 510, a decision is made as to whether the User1 has access to the hr_data table 410. In an embodiment, this access determination is based on the user's assigned security level. That is, at 510, based upon a consulting of the user security level table 475 of FIG. 6, a determination is made as indicated at 512 as to whether the user's security level is greater or equal than the security level associated with the resource attempted to be accessed, or whether the user's security level is less than the security level associated with the resource attempted to be accessed. If the user's security level is determined to be less than the security level of the resource, then the access request to that resource is rejected or denied; otherwise, if the user's security level is determined to be greater than or equal to the security level of the resource, then the user is granted access to that resource and the process proceeds to 520. A further determination can be made as to whether the user's ability to access the resource had been automatically revoked, e.g., due to the fact that this user hadn't access this resource for a pre-determined access time window. In an embodiment, this access information is recorded in an access history table 550 populated with each user's time series data collected for use in building the forecasting model. For example, in the example of creating the hr_data table 410 of FIG. 6, it is the case that User1 has a security level of 8 and User2 has a security level of 2. Thus, User1 will be granted access to the emp_name field and salary field (many rows) of the hr_data table as that User1's security level (e.g., value=8) is greater or equal to the resource security level (e.g., values 2 and 8, respectively), while User2 will be granted access to the emp_name field only (one row) and not access to the salary field of the hr_data table as that User2's security level (e.g., value=2) is only equal to the resource security level of the emp_name field (e.g., value of 2). Then, upon granting access or not to the requesting user, the process proceeds to 520 which involves the collection and recording of the user activity in the access history table. In the example, the access history table 550 that is built includes at least: a column 552 indicating the user; a column 554 indicating the action associated with the resource that has been taken by the user, e.g., read, write, etc.; a column 556 indicating the resource that has been successfully accessed by the user; a column 556 indicating the resource that has been attempted to be accessed; and a column 558 indicating a time stamp associated with that user's action concerning the resource. Then, continuing to 525, there is depicted the further step of analyzing the access history data, and the building, i.e., training, of the access model, i.e., a time series prediction model for each user/role. Continuing to 530, FIG. 7, based upon the analyses, the method then determines whether to revoke a user's access if a predetermined amount of time has elapsed and/or a time window for accessing a resource has been exceeded.

FIG. 8 depicts an example of a resource action time window table 600 resulting from the collecting and analyzing of resource usage data. As shown in FIG. 8, the resource action time window table 600 that is built includes at least: a column 602 indicating the resource (e.g., salary_table, log_table); a column 604 indicating the action associated with the resource that has been taken by the user, e.g., read, write, etc.; a column 606 indicating the resource action level which can be a value between 0, 1, . . . , 10 with value 0 indicating a least sensitive resource in which a user assigned a low security level can access that resource, and a value 10 indicating a very high sensitive resource requiring a user with a higher security level to access that resource. It is understood that a resource action level value may be determined based upon a risk ratio evaluated for a different risk/action type as shown in FIG. 5; and a column 608 indicating a time window that a user has not accessed the resource, and after which the user may be automatically revoked access, e.g., time window ranging from a week to year, or any other time granularity. For example, if a user has not accessed a particular resource 602 (e.g., a column in a Salary_table) for the defined time window indicated in col. 608 (e.g., 1 month), then the user's access permission may be revoked, or the user removed from the group after this period of time expires from the last access. Alternatively, depending upon the security policy, a subsequent use or activity by that user accessing that resource may trigger an outlier alarm or outlier alert (e.g., an alarm sent to a security officer). For example, if a user has not attempted to access a column in the Salary_table after exceeding the one month time window specified at col. 608, yet that user had accessed the table three months earlier, i.e., then an alert may be generated about this outlier activity to which a security officer may grant access or not. The analyzing of the access history data, and the building, i.e., training, of the access model for each user/role makes use of the access history table 550 and the resource action time window table 600.

Returning to FIG. 2, at 700, the system generates a graph modeling view or visualization 725 based on the gathered time series usage data model and outlier activities. Graph visualization tools may be implemented such as open source tools, D3.js, deck.gl, Vega, etc. or other graph modeling tools such JanusGraph, Neo4j, Cassandra. Alternately, IBM Watson® Studio (Registered Trademark of International Business Machines, Inc.) may be used to build and run graphical models. Once generated, the graph model view 725 enables one to quickly (i.e., in real-time or near real-time) visualize the time series model results including the correlations between types of users, the user roles, and the types of resources the user's can access and any outlier activity corrections. The graph model view can be used to further visualize the user access pattern of the database. In an embodiment, the graph model view or visualization enables the monitoring of unusual behaviors and the generating of a real-time alert that can be communicated to a security officer or manager to notify the officer or manager when a user has not accessed a resource he/she has authority to in a long time.

Figure 9A:
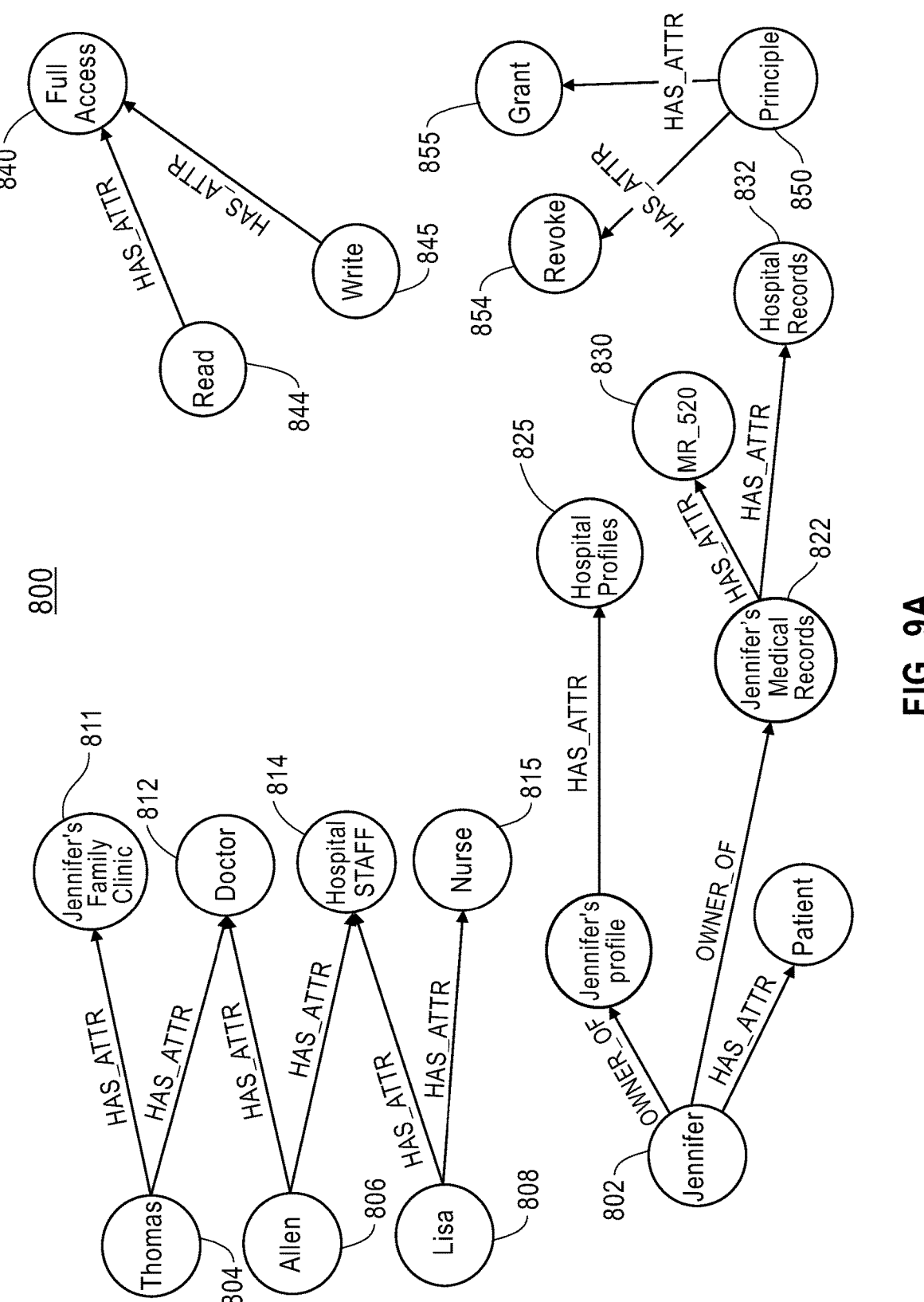
FIG. 9A depicts a non-limiting use-case example in which a generated graph model view is used to study the service and management use cases of a medical system, associating entities and attributes and the resources or objects each role can access according to an embodiment.
Figure 9B:
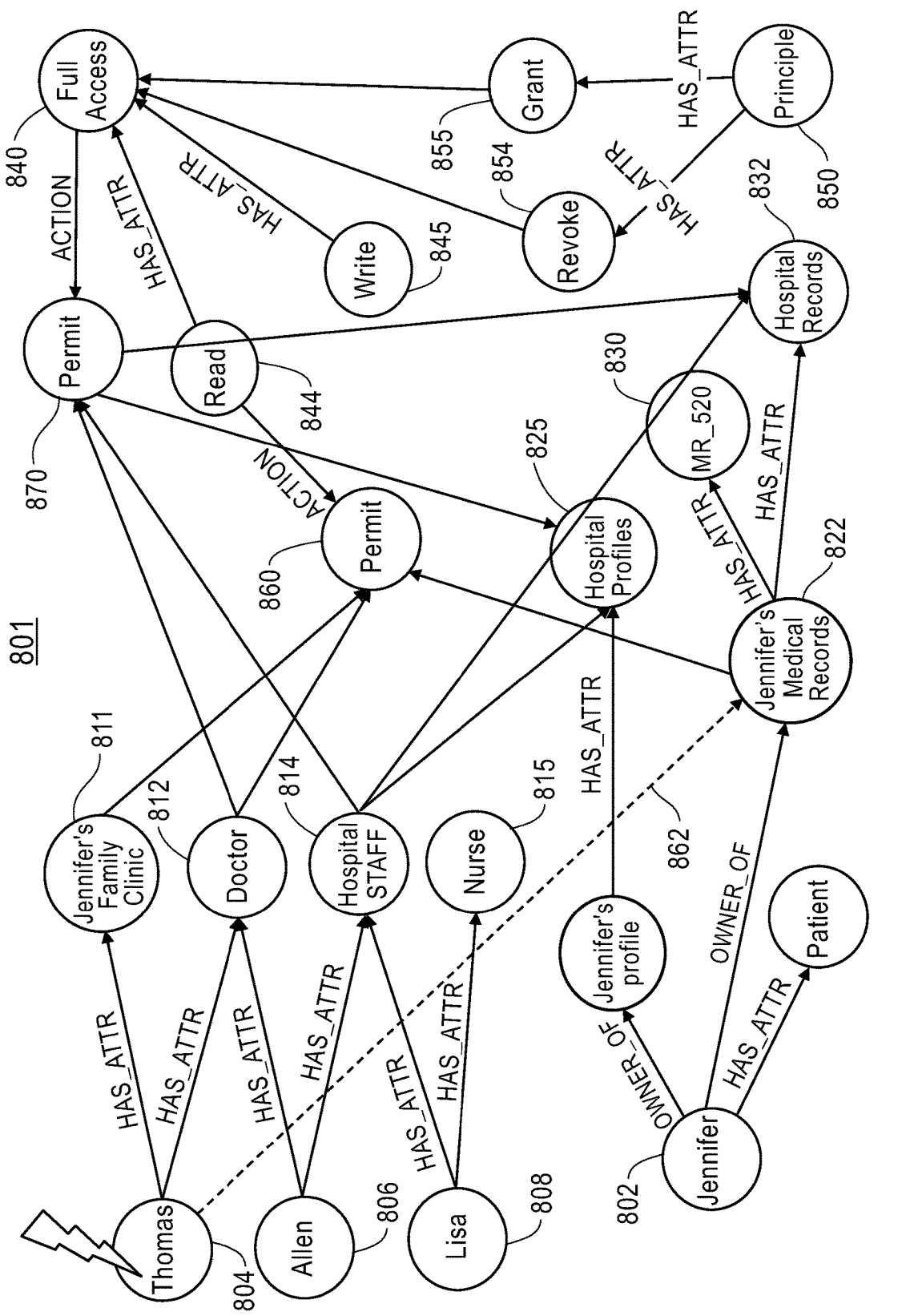
FIG. 9B depicts a further graph model view of the graph model view of FIG. 9A that is used to inform a user (e.g., a security officer/manager) of kinds of resources that can be accessible to the user according to an embodiment.

FIGS. 9A, 9B depict a non-limiting use-case example in which a generated graph model view 800 is used to study the service and management use cases of a medical system, associating entities and attributes, e.g., "roles" such as patients, doctors, nurses, and staff, etc. and the resources or objects each role can access. This graph model view is used to control which objects different roles can access and permissions. Graph databases excel at querying connected data, so graph traversal or graph search algorithms such as depth-first search (DFS), breadth-first search (BFS) are implemented to effectively evaluate complex strategies. In the example use-case scenario depicted in FIG. 9A, the following entities (Jennifer, Thomas, Allen and Lis) have an associated initial attribute (HAS_ATTR) that associates to their respective (different) roles in a healthcare system (e.g., patient, doctor, hospital staff member, nurse). Similarly, FIG. 9A depicts initial types of access authorizations/authorization actions (permissions, full access) and their associated attributes (e.g., read, write, revoke, grant). All entities and roles are depicted as nodes in the model graph view 800 including:

Jennifer 802 who is a patient 810 who has medical records at the hospital;

Thomas 804 is Jennifer's family clinician 811 and also a doctor 812 at the hospital;

Allen 806 is both a doctor 812 and a staff member 814 of the hospital;

Lisa 808 is both a nurse 815 and a hospital staff member 814.

The graph depicted in FIG. 9A presents the above data as an initial set of connected primitive and attribute nodes with the users each initially having different roles in this healthcare system and accessing different objects. For example, Jennifer node 802 connects to primitive node 820 representing Jennifer's profile, and Jennifer's profile connects to an attribute node hospital profiles 825. Similarly, Jennifer node 802 connects to a primitive node 822 representing that Jennifer is an owner of (OWNER_OF) Jennifer's medical records, and Jennifer's medical records node connects to attribute medical record MR_520, node 830, and also connects to Hospital Records attribute node 832. All remaining nodes 811, 812, 814, 815, are role attribute nodes. Additionally depicted is a "full access" permission action node 840 connecting to attribute nodes read 844 and write 845 and providing read and/or write privileges to users, and a principle node 850 connecting to attribute nodes revoke 854 and grant 855 providing a grant or a revocation of a certain action(s).

Based on this example graph model view 800 of FIG. 9A and based on a corresponding generated time series model that knows database resources and related usage activity of Thomas 804, Allen 806 and Lisa 808, the graph modeling view is adjusted to result/show different usages in the graph view 801 of FIG. 9B. This graph view 801 may be visualized on a computer-device display (not shown) associated with a security officer who can responsively make real-time decisions such as to grant user's access (or not) to resources, for example, In an embodiment, graph traversal algorithms (e.g., DFS, BFS) invoked upon the graph model view 801 of FIG. 9B can be used to inform a user (a security officer) of kinds of resources that can be accessible to the user. For example, an enhanced graph view 801 shown in FIG. 9B is generated with example implications of sample policies. One sample implication includes the following: A family clinician has only read permission at 860 to read a patient's medical records. Thus, a search would reveal, at 862, that Jennifer's family clinician Thomas 804 can read Jennifer's medical records 822 as only a doctor 812 who is also a hospital staff member has full action access permission 870 to perform both read and write to hospital profiles 825 and hospital records 832. Thus, by detecting prior activity of Thomas reading Jennifer's medical records 820, this has triggered an outlier that would be detected and is shown in the resulting graph view 801 at 826. Similarly, a member of the hospital staff 814 has full access permission 870 to both read and write to hospital profiles 825 and hospital records 832. Given these exemplary permissions, further implications of the sample policies in the graph view 801 of FIG. 9B result such as:

Allen 806 can write to Jennifer's medical record MR_520 at node 830.

Thomas can read MR_520 at node 830.

Thomas cannot write to MD_520 record 830 as Thomas only has read permission at nodes 844/860

In the non-limiting example use-case of FIG. 9B, if a long time had elapsed since Thomas' prior access to Jennifer's Medical Records 822, any subsequent access by Thomas to read Jennifer medical Records 822 can trigger an alert to a security officer who may decide whether to grant access or recommend removing Thomas's permission to access based on the detected prior outlier action 826 and a relevant time window, e.g., indicated in that resource action time window table 600.

Using the graph model view generated based on the time series predictive models generated by detecting database resource access patterns, and further based upon detecting any outlier activities, as reflected in the graph view, a security officer can responsively change user access policy or security policy, such as by changing the resource security level, a user security level, a user role, a time window and/or other parameters of the user security level table 475 (FIG. 6) or resource action time window table 600 of FIG. 8. The security officer will communicate to a user and/or a security policy implementer any changes or recommendations to change a user role, a type of activity and/or resource or user security level. Thus, the graph modeling view provides a user, e.g., a security officer a database access control perspective to ensure the credibility of database object usage patterns in cloud computing environment. Based on created and trained access patterns for users and protected resources, the system produces implicit in-memory sub-groups for users with similar access requirements as the visible sub-group in the example of FIG. 4. From the graph modeling, a user can perform usage mapping and monitoring and can limit users' resource accesses according to their history behaviors.

Further, based on the graph model view, a user can perform altering outlier activities to monitor real-time database resource usage requests and give out warnings when a database resource is not used during the history collection period.

Figure 10:
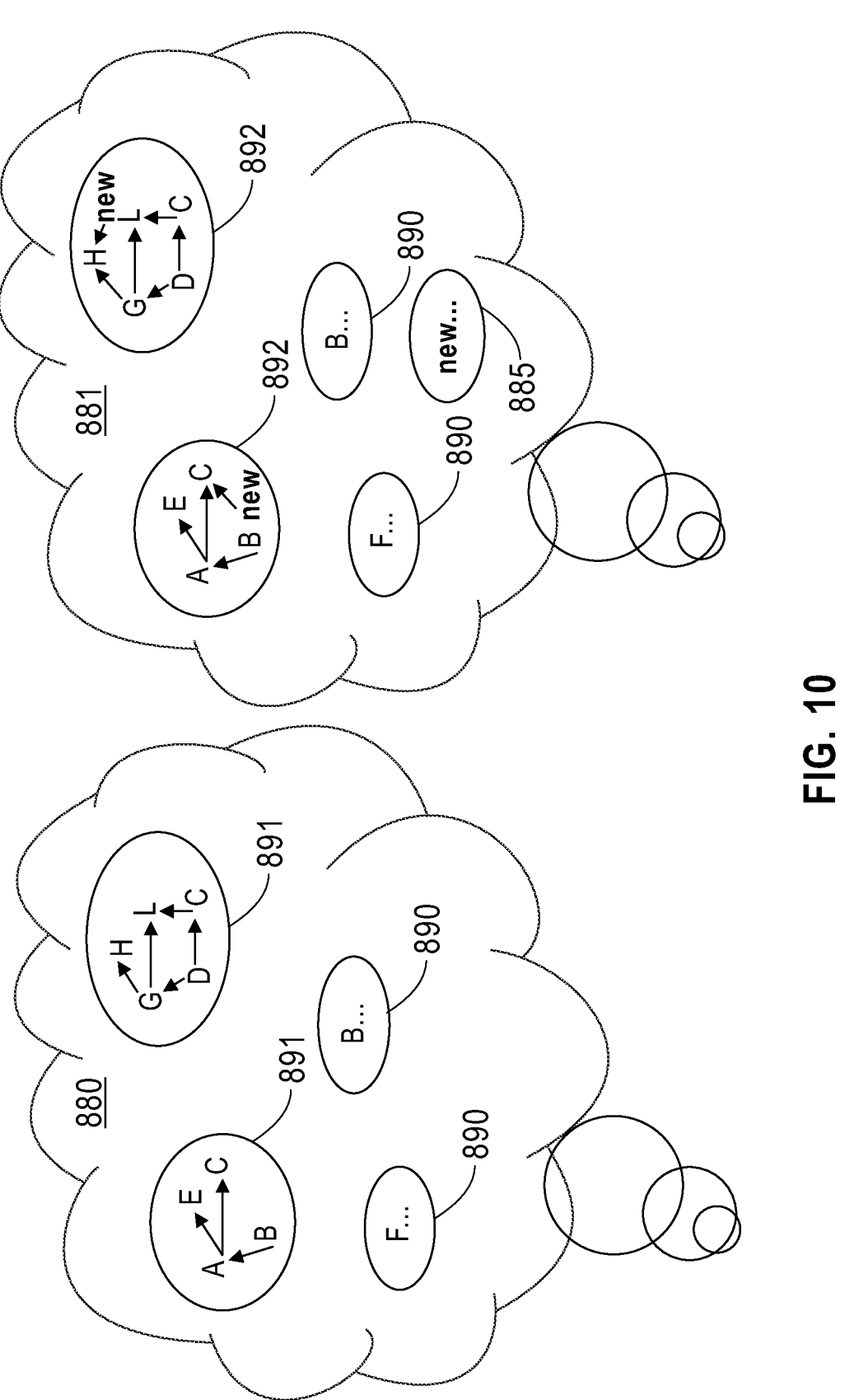
FIG. 10 depicts the system's ability to split/merge models according to an embodiment.

Referring to FIG. 10, there is depicted the system's ability to split/merge models. For example, in FIG. 10, a centralized cloud cluster view 880 depicts a plurality of nodes 890, 891 each node representing a different hospital group(s). For example, node 891 depicts several different hospitals labeled A, B, C, E, where each hospital can be different, e.g., children's hospital vs. general population hospital, albeit each having very similar user role types and resource usage activities. As a consequence, a same time series prediction model may be implemented or shared together by each of these hospitals. For similar business clouds that add/remove nodes, a whole view can be updated in real-time. Thus, in the second depiction of cloud cluster view 881, a new hospital at node 885 is added, and initially, the existing prediction model at the initial cloud cluster view 880 can be shared or implemented at the new incoming hospital node 885. Over time, at updated hospital group nodes 892 incorporating the new hospital node 885, the existing model used at the first cloud cluster view 880 may be shared or implemented.

Figure 11:
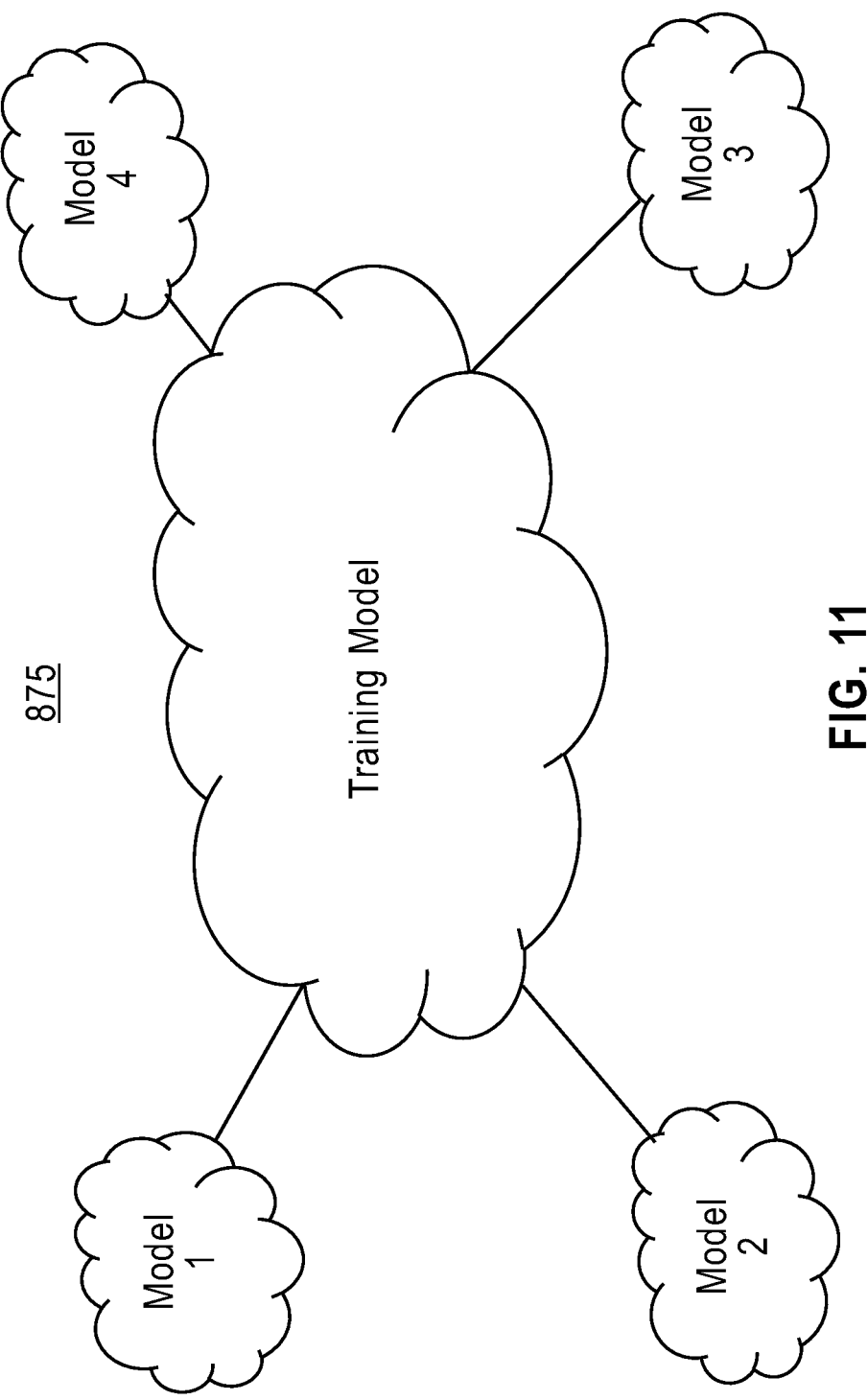
FIG. 11 conceptually depicts further functionality of the system's ability to merge models, e.g., for the graph computing on the cloud depicted in FIG. 10.

FIG. 11 depicts further functionality of the ability to merge models, e.g., for the graph computing on the cloud depicted in FIG. 10. For example, given the example healthcare scenario of FIG. 10, different hospitals, e.g., hospitals A, B, C, E of FIG. 10, each implement a respective different time series prediction model, e.g., models labeled Model 1, Model 2, Model 3 and Model 4. FIG. 11 depicts the merging 875 of the several models Model 1 to Model 4 to generate a single time series prediction model that can be used/shared by each hospital in a cluster view.

The system and methods presented herein provide database resource access advantages including but not limited to: a provision of clear access mapping and monitor solutions; a Graph modeling step to create trained access patterns for users protected resources, produce in-memory implicit subgroups for users with similar access requirements, and limit their resource accesses according to their history behaviors; an ability to alter outlier activities to monitor real-time database resource usage requests and give out warnings when a database resource is not used during the history collection period; and the utilization of a graphical model to visualize the user access pattern of the database. Further, the system and method employs machine learning methods, including time series analysis and clustering, as well as anomaly detection techniques to identify user behavior patterns and access boundaries. so that unconventional accesses are recorded, enabling finer-grained access control and auditing without affecting everyday user activities.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
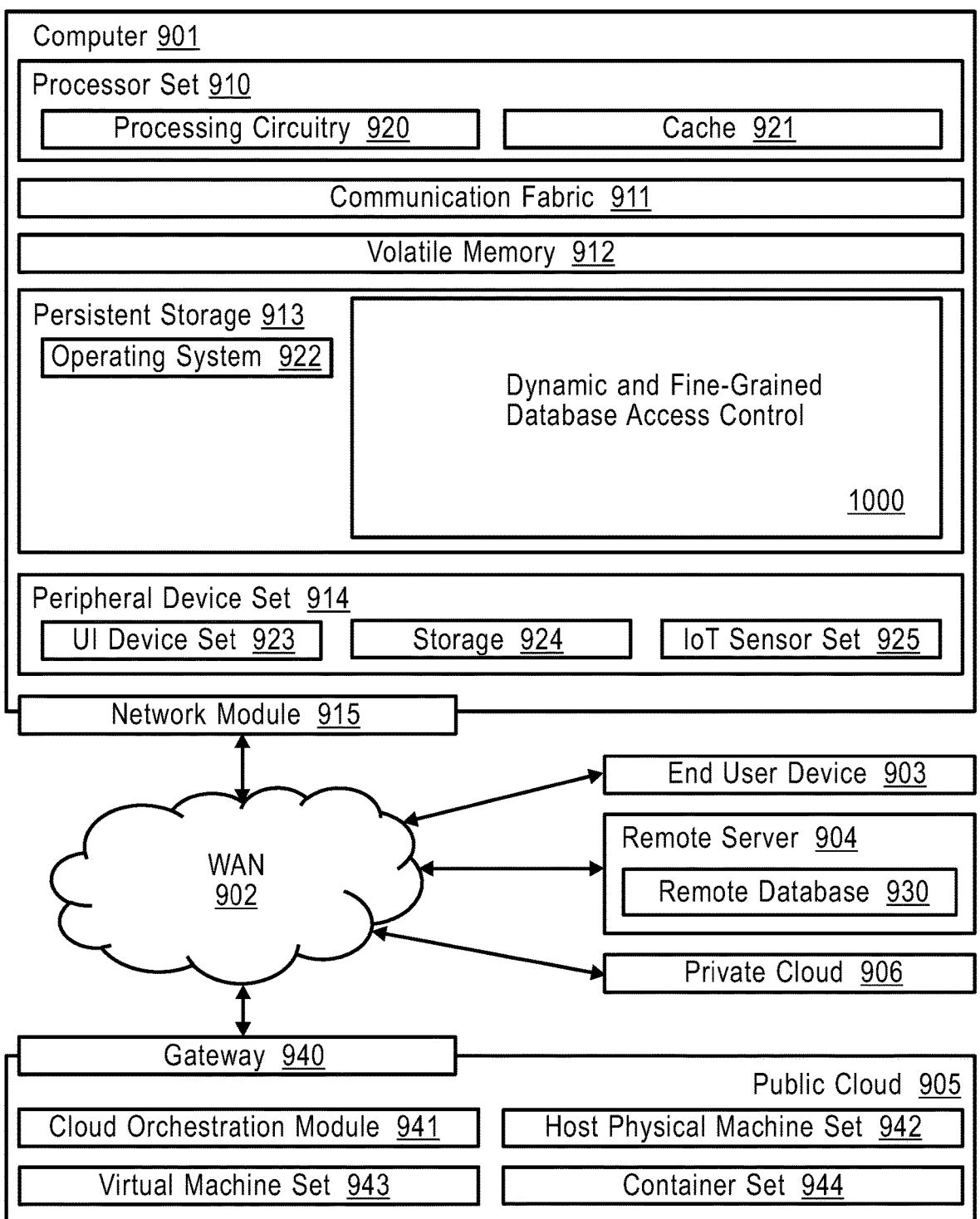
FIG. 12 depicts a computing environment containing an example of an environment for the execution of at least some of the computer code involved in performing the methods according to the embodiments herein.

FIG. 12 depicts a computing environment containing an example of an environment for the execution of at least some of the computer code involved in performing the inventive methods such as code 1000 for providing dynamic and more fine-grained database access control including the time series prediction model generation, outlier activities detection and graph modeling visualization tools according to the embodiments herein. In addition to block 902, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 701, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Computer 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/ or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

Processor Set 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 200 in persistent storage 913.

Communication Fabric 911 is the signal conduction path that allows the various components of computer 901 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

Persistent Storage 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 200 typically includes at least some of the computer code involved in performing the inventive methods.

Peripheral Device Set 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

Network module 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

Remote Server 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

Public cloud 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment and terminology were chosen and described in order to best explain the principles of the invention and the practical application, and to enable others of ordinary skill in the art to understand the invention for various embodiments with various modifications as are suited to the particular use contemplated.

What is claimed is:

1. A computer system for database access control, said system comprising:

a hardware processor associated with a memory storing program instructions in a computer system, the hardware processor running the program instructions configuring the processor to:

monitor database usage activities of users of a database resource object, the users having an associated role;

run a machine learned model trained to predict, based on past database resource usage activities by the users having a same associated role, a user activity with respect to a database resource object for a particular role, wherein to monitor database usage activities, the hardware processor is further configured to:

obtain time-series data from past database resource object usage by the users; and train said machine learned prediction model using said time-series data obtained;

tag, based on said predicted user activity, a user with an associated security level, and tag the database resource object with a resource action level indicating a degree of authorization required to access the database resource object by a user;

in response to a received user request to access a database resource object, grant the user access to the requested database resource object based on that user's associated security level and the resource action level associated with the requested database resource object, wherein the hardware processor is further configured to:

identify, using said machine learned prediction model, patterns of user activity with respect to database resource objects;

associate, based on identified patterns of user activities with respect to a database resource object, a database resource object action; and modify, responsive to a predicted user activity, said resource action level associated with the database resource object action.

2. The computer system as claimed in claim 1, wherein the hardware processor is further configured to:

determine whether the received user request to access a database resource object is an outlier activity with respect to a database resource object usage for the associated user role; and generate an alert when the received user request is determined as an outlier activity.

3. The computer system as claimed in claim 2, wherein the hardware processor is further configured to:

generate, based on said identified user activity patterns, a graph model view for visualizing the user access patterns on a display device, said graph model view having an interconnection of first nodes corresponding to users, and second nodes corresponding to database resources.

4. The computer system as claimed in claim 3, wherein the hardware processor is further configured to:

use said graph model view to determine, in real time, whether a current received user request for a database resource is an outlier activity.

5. The computer system as claimed in claim 2, wherein the hardware processor is further configured to:

produce one or more implicit sub-groups of users having similar database resource object access requirements;

store said one or more implicit sub-groups of users in a memory; and limit the resource accesses of users in the implicit sub-group of users according to the users' prior database resource object access activity pattern.

6. The computer system as claimed in claim 1, wherein the hardware processor is further configured to:

associate, based on identified patterns of user activities with respect to a database resource object, a time window with database resource object action, the time window indicating a period of time a user is authorized to perform the database resource object action;

determine a time elapsed since a time a user has last performed the action with respect to the database resource object; and automatically revoke a user's authorization to perform the database resource object action after the elapsed time has exceeded the time window period.

7. The computer system as claimed in claim 1, wherein to grant the user to access the requested database resource object, the hardware processor is further configured to:

compare a user's associated security level against the resource action level associated with the requested database resource object; and grant user access to the requested database resource object when the user's associated security level exceeds the resource action level of the requested database resource object.

8. The computer system as claimed in claim 1, wherein the hardware processor is further configured to:

employing said machine learning prediction model and including a time-series analysis, a clustering and an anomaly detection to identify both said pattern of user activities with respect to database resource objects and access boundaries; and recording unconventional database accesses to result in an increased granular access control and audit without affecting everyday user activities.

9. The computer system as claimed in claim 1, wherein the hardware processor is further configured to:

generate a cloud cluster view having nodes representing entities and associated entity attributes;

split/merge a cloud cluster view for connecting a new node representing another entity; and one of: add/remove the new node in the cluster view instantaneously, in real time.

10. A method for database access control comprising:

monitoring, using a hardware processor at a computer system, database usage activities of users of a database resource object, the users having an associated role;

running, using the hardware processor, a machine learned model trained to predict, based on past database resource usage activities by the users having a same associated role, a user activity with respect to a database resource object for a particular role, wherein the monitoring of database usage activities of users comprises:

obtaining, using the hardware processor, time-series data from past database resource object usage by the users;

training, using the hardware processor, said machine learned prediction model using said time-series data obtained from past database resource object usage by the users; and tagging, using a hardware processor, based on said predicted user activity, a user with an associated security level, and tagging the database resource object with a resource action level indicating a degree of authorization required to access the database resource object by a user; and in response to a received user request to access a database resource object, granting the user to access the requested database resource object based on that user's associated security level and the resource action level associated with the requested database resource object;

identifying, using said machine learned prediction model, patterns of user activity with respect to database resource objects;

associating, based on identified patterns of user activities with respect to a database resource object, a database resource object action; and modifying, responsive to a predicted user activity, said resource action level associated with the database resource object action.

11. The method as claimed in claim 10, further comprising:

determining, using the hardware processor, whether the received user request to access a database resource object is an outlier activity with respect to a database resource object usage for the associated user role; and generating an alert when the received user request is determined as an outlier activity.

12. The method as claimed in claim 11, further comprising:

generating, based on said identified user activity patterns, a graph model view for visualizing the user access patterns on a display device, said graph model view having an interconnection of first nodes corresponding to users, and second nodes corresponding to database resources, and using said generated graph model view to determine, in real time, whether a current received user request for a database resource is an outlier activity.

13. The method as claimed in claim 11, further comprising:

producing, using the hardware processor, one or more implicit sub-groups of users having similar database resource object access requirements;

storing said one or more implicit sub-groups of users in a memory; and limiting the resource accesses of users in the implicit sub-group of users according to the users' prior database resource object access activity pattern.

14. The method as claimed in claim 10, further comprising:

associating, based on identified patterns of user activities with respect to a database resource object, a time window with database resource object action, the time window indicating a period of time a user is authorized to perform the database resource object action;

determining a time elapsed since a time a user has last performed the action with respect to the database resource object; and automatically revoking a user's authorization to perform the database resource object action after the elapsed time has exceeded the time window period.

15. The method as claimed in claim 10, wherein the granting the user to access the requested database resource object comprises:

comparing, using the hardware processor, a user's associated security level against the resource action level associated with the requested database resource object; and granting user access to the requested database resource object when the user's associated security level exceeds the resource action level of the requested database resource object.

16. The method as claimed in claim 10, further comprising:

employing, using the hardware processor, said machine learning prediction model and including a time-series analysis, a clustering and an anomaly detection to identify both said pattern of user activities with respect to database resource objects and access boundaries; and recording unconventional database accesses to result in an increased granular access control and audit without affecting everyday user activities.

17. The method as claimed in claim 10, further comprising:

generating, using the hardware processor, a cloud cluster view having nodes representing entities and associated entity attributes;

splitting/merging a cloud cluster view for connecting a new node representing another entity; and one of: adding/removing the new node in the cluster view instantaneously, in real time.

18. A computer program product for database access control, the computer program product comprising:

one or more computer readable storage media, and program instructions collectively stored on the one or more computer readable storage media, the program instructions comprising:

program instructions to monitor database usage activities of users of a database resource object, the users having an associated role;

program instructions to run a machine learned model trained to predict, based on past database resource usage activities by the users having a same associated role, a user activity with respect to a database resource object for a particular role, wherein to monitor database usage activities of users, the program instructions further comprise:

program instructions to obtain time-series data from past database resource object usage by the users;

program instructions to train said machine learned prediction model using said time-series data obtained from past database resource object usage by the users;

program instructions to tag, based on said predicted user activity, a user with an associated security level, and tag the database resource object with a resource action level indicating a degree of authorization required to access the database resource object by a user; and in response to a received user request to access a database resource object, program instructions to grant the user to access the requested database resource object based on that user's associated security level and the resource action level associated with the requested database resource object;

program instructions to identify, using said machine learned prediction model, patterns of user activity with respect to database resource objects;

program instructions to associate, based on identified patterns of user activities with respect to a database resource object, a database resource object action; and program instructions to modify, responsive to a predicted user activity, said resource action level associated with the database resource object action.

19. The computer system product as claimed in claim 18, further comprising:

program instructions to determine whether the received user request to access a database resource object is an outlier activity with respect to a database resource object usage for the associated user role; and program instructions to generate an alert when the received user request is determined as an outlier activity.

\* \* \* \* \*